United States Patent
Grigoriadis et al.

(10) Patent No.: US 12,430,902 B2
(45) Date of Patent: Sep. 30, 2025

(54) APPARATUS AND METHOD FOR DETECTING ELEMENTS OF AN ASSEMBLY

(71) Applicant: Vodafone Group Services Limited, Newbury (GB)

(72) Inventors: Orlando Grigoriadis, Newbury (GB); Nazmi Shafin, Newbury (GB)

(73) Assignee: Vodafone Group Services Limited, Newbury (GB)

( * ) Notice: Subject to any disclaimer, the term of this patent is extended or adjusted under 35 U.S.C. 154(b) by 395 days.

(21) Appl. No.: 17/999,836

(22) PCT Filed: May 24, 2021

(86) PCT No.: PCT/GB2021/051259
§ 371 (c)(1),
(2) Date: Nov. 23, 2022

(87) PCT Pub. No.: WO2021/240137
PCT Pub. Date: Dec. 2, 2021

(65) Prior Publication Data
US 2023/0215154 A1   Jul. 6, 2023

(30) Foreign Application Priority Data
May 29, 2020   (EP) ..................................... 20386029

(51) Int. Cl.
*G06V 10/00*   (2022.01)
*G06V 10/80*   (2022.01)
(Continued)

(52) U.S. Cl.
CPC ............ *G06V 10/82* (2022.01); *G06V 10/809* (2022.01); *G06V 30/10* (2022.01); *G06V 30/18057* (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 7,324,695 B2 *   1/2008   Krishnan ................ H04L 69/04
                                                              382/232
7,602,941 B2 *  10/2009   Xie ....................... G06V 40/171
                                                              348/169

(Continued)

OTHER PUBLICATIONS

Article . September et al: "Fast and accurate object detection in high resolution 4K and 8K video using GPUs", Sep. 1, 2018 (Sep. 1, 2018), URL:https://arxiv.org/pdf/1810. 10551.pdf * abstract; figure 4 * * sec. 2.2 *.

(Continued)

*Primary Examiner* — Amir Alavi
(74) *Attorney, Agent, or Firm* — Workman Nydegger

(57) ABSTRACT

A processing module for a communication device includes memory for storing a key and processing elements. These elements receive a current sequence number and a random number from a network entity, and check if the current sequence number is within a range based on a previously received sequence number stored in memory. If not, they generate a sequence number encryption key from the random number and stored key, encrypt the previously received sequence number using a block cipher encryption function, and send the encrypted sequence number in a response message to the network entity.

17 Claims, 6 Drawing Sheets

(51) Int. Cl.
   *G06V 10/82* (2022.01)
   *G06V 30/10* (2022.01)
   *G06V 30/18* (2022.01)

(58) Field of Classification Search
   CPC .... G06N 3/092; G06N 3/0454; G06N 3/0475; G06N 3/0464; G06V 10/82; G06V 10/809; G06V 30/18057; G06V 30/10
   See application file for complete search history.

(56) References Cited

U.S. PATENT DOCUMENTS

| | | | |
|---|---|---|---|
| 9,200,890 B2* | 12/2015 | Peterson | G01N 21/8806 |
| 10,083,496 B2* | 9/2018 | Peterson | G06T 7/001 |
| 11,216,717 B2* | 1/2022 | Baum | G06N 3/02 |
| 11,221,929 B1* | 1/2022 | Katz | G06N 3/04 |
| 11,238,334 B2* | 2/2022 | Baum | G06F 9/30134 |
| 11,811,421 B2* | 11/2023 | Kaminitz | G06N 3/063 |
| 11,874,900 B2* | 1/2024 | Kaminitz | G06V 10/75 |
| 2003/0147554 A1* | 8/2003 | Wei | G06V 10/32 |
| | | | 382/190 |
| 2005/0001013 A1* | 1/2005 | Xie | G06V 40/171 |
| | | | 228/103 |
| 2023/0215154 A1* | 7/2023 | Grigoriadis | G06V 10/809 |
| | | | 382/159 |

OTHER PUBLICATIONS

International Search Report & Written Opinion for application No. PCT/GB2021/051259 mailed on Jul. 6, 2021.

* cited by examiner

APPARATUS AND METHOD FOR DETECTING ELEMENTS OF AN ASSEMBLY

CROSS-REFERENCE TO RELATED APPLICATIONS

The present invention is a 35 U.S.C. § 371 U.S. National Stage of PCT Application No. PCT/GB2021/050276, filed on May 24, 2021, which claims priority to EP 20386029.1, filed on May 29, 2020. The entire content of each of the aforementioned patent applications is incorporated herein by reference.

TECHNICAL FIELD

The application relates to apparatuses and methods for detecting elements of an assembly. In particular, the application relates to artificially intelligent classifiers for detecting electrical components in a printed circuit board.

BACKGROUND

A mobile telecommunications network deployed at scale is a complex engineered system that requires careful planning, control and maintenance. The network includes a Radio Access Network comprising a large number of nodes provided by base station transceivers that give cellular radio coverage for voice and data communications with user equipment dispersed throughout the network. Various Radio Access Technologies may be implemented in the Radio Access Network, such as a Universal Mobile Telecommunications System (UMTS), Terrestrial Radio Access Network (UTRAN), or an Evolved UTRAN (E-UTRAN) in a Long Term Evolution (LTE) system.

The mobile communications network further includes a Core Network, such as an Evolved Packet Core, connected to the Radio Access Network. The Core Network includes a number of network entities such as various gateway, subscription and mobility management servers to control the registration, authentication and serving of user equipment in the network and to route the user voice and data communications in the mobile communications network and to and from external packet data networks such as the Internet.

In order to build, maintain and upgrade complex engineered systems, such as a mobile communications network, providers are required to source and integrate large amounts of mobile network equipment from different suppliers according to the developing systems engineering design, so that the equipment works together in synergy to provide the Radio Access Network and the Core Network.

In order to assess whether the available equipment is appropriate to fulfil the system requirements, it is desirable to appraise the supplier equipment to properly understand it when seeking to design and build system. For example, in order to decide which equipment to acquire to assemble the complex system, mobile network operators must take into account technical, systems, interoperability, budgetary and other design constraints.

Some mobile network equipment may consist of assemblies of common electronic components such as microcontrollers, capacitors, integrated circuit (IC) processors built according to generic equipment designs, which may be available from a wide range of suppliers. Other mobile network equipment may contain assemblies including more bespoke components, which are made according to proprietary designs and are available only from specific suppliers.

Knowing whether an item of mobile network equipment is an assembly primarily of generic elements, or if it includes bespoke elements, may significantly affect decisions being taken when sourcing equipment from available suppliers, and it can also affect the design and development of the mobile network itself.

Further, complex systems may need to be maintained and upgraded by replacing or emulating legacy components in the system. In some instances, legacy hardware can, to some extent, be virtualised in software. The hardware may not be documented to the extent needed to readily enable its replacement, upgrading or virtualisation, in order to ensure the integrity of the system. Thus, some existing hardware components in complex systems may need to be appraised, or reverse engineered, in order to be understood to the extent needed to facilitate the maintenance and improvement of the complex system.

However, it can be difficult to appraise assemblies of elements such as electronic components in a Printed Circuit Board (PCB) or semiconductor IP blocks in an integrated circuit layout by visual inspection alone. A typical PCB measuring tens of centimetres across may include in its layout hundreds to many thousands of surface mounted electronic components ranging in size from as large as 10-15 centimetres across down to as small as 0.5-1 millimetres in size.

Thus, effective appraising of assemblies of elements, such as mechanical, electrical and electronic components, that can vary in size and be present in large numbers, is generally infeasible. As such, when designing and building complex systems, insights into the elements assembled to make up the available equipment are limited.

It is in this context that the present disclosure was devised.

SUMMARY OF THE DISCLOSURE

Viewed from one aspect, the present disclosure provides apparatus for detecting elements of an assembly, comprising: one or more processors; and memory storing first and second artificially intelligent (AI) classifiers for detecting elements in a high-resolution image of the assembly. The first artificially intelligent classifier is pre-trained to detect first elements and the second artificially intelligent classifier is pre-trained to detect second elements, each of the first elements having a size within a first size range, and each of the second elements having a size within a second size range, in which the first size range is greater than the second size range. The memory comprises instructions which, when executed by one or more of the processors, cause the processor(s) to: receive a high resolution image of the assembly; sequentially use the first classifier and then the second artificially intelligent classifier to: create plural scaled sub-images taken from the high resolution image, each sub-image having a size of at least the maximum size of the respective first or second elements, and scaled to be resized to a pixel input image size of the artificially intelligent classifier; ingest the scaled sub-images into the artificially intelligent classifier to search for elements in the scaled sub-images; and obtain, from the output of the artificially intelligent classifier, data indicative of bounding box coordinates in the high resolution image corresponding to detected first and then second elements. The memory further comprises instructions to cause the processor(s) to prevent the second artificially intelligent classifier from subsequently searching within the bounding boxes previously obtained by the first artificially intelligent classifier.

In embodiments, a high resolution image may be of sufficient resolution such that the smallest elements for identification are resolvable in sufficient detail needed to perform reliable object identification of them by machine vision techniques. In embodiments, the resolution of the high resolution image is such that the smallest elements for identification in the second, or smallest, size range, are resolvable in sufficient detail needed to perform reliable object identification of them by machine vision techniques. In embodiments, the smallest elements for identification in the second, or smallest, size range, extend across the size of at least 50 pixels in the high resolution image.

In embodiments, the memory may further store a third artificially intelligent classifier pre-trained to detect third elements, each of the third elements having a size in a third size range, in which the third size range includes elements having a size that is less than the size of elements included within the second size range. The instructions may further cause the processors to sequentially use the second and then the third artificially intelligent classifier to: create plural scaled sub-images taken from the high resolution image, each sub-image having a size of at least the maximum size of the respective second or third size range, and scaled to be resized to a pixel input image size of the artificially intelligent classifier; ingest the scaled sub-images into the artificially intelligent classifier to search for elements in the scaled sub-images; and obtain, from the output of the artificially intelligent classifier, data indicative of bounding box coordinates in the high resolution image corresponding to detected first and then second elements. The memory may further comprise instructions to cause the processor(s) to prevent the third artificially intelligent classifier from subsequently searching within the bounding boxes obtained by the first and second artificially intelligent classifiers.

In embodiments, the instructions may further cause the processor(s) to create the plural scaled sub-images for each of the artificially intelligent classifiers, by moving a sliding window through the high-resolution image. The sliding window may have a size of at least the maximum size of the respective elements, such that each sequential sub-image overlaps the area of the previous sub-image by at least 50%. The sub-images may be scaled for ingesting into the corresponding artificially intelligent classifier. The minimum overlap with the previous sub-image may be greater than 50%. In embodiments, the overlap may be at least 60%. In embodiments, the overlap may be at least 70%. In embodiments, the overlap may be at least 80%. In embodiments, the overlap may be at least 90%.

In embodiments, one of the size ranges may include elements having a size of 1 cm across and another of the size ranges may include elements having a size of 5 cm across.

In embodiments, the pixel extent of the bounding boxes for the elements detected by each of the artificially intelligent classifiers may be spatially separated from the pixel extent of the bounding boxes for the elements detected by the one or more other artificially intelligent classifiers.

In embodiments, the instructions may further cause the processor(s) to prevent the second artificially intelligent classifier from subsequently searching within the bounding boxes obtained by the first artificially intelligent classifier by obscuring the areas inside the bounding boxes in the high-resolution image.

In embodiments, the instructions may further cause the processors to: store, in the memory, data indicative of bounding box coordinates in the high-resolution image, the bounding box coordinates corresponding to elements detected by the artificially intelligent classifiers. To suppress overlapping bounding boxes, the instructions may further cause the processors to repeatedly, and until no overlapping bounding boxes are found: sort the bounding boxes in order by their coordinates; group the ordered bounding boxes into separate lists of bounding boxes; and within each group, test the bounding boxes for overlapping extent; and discard any overlapping bounding boxes; to thereby generate a set of coordinates for respective single bounding boxes of each component within the high resolution image.

In embodiments, each artificially intelligent classifier may be configured to detect only a single class of objects corresponding to candidate detections of elements. In embodiments, the instructions may further cause the processors to identify a type of element in each bounding box detected by the artificially intelligent classifiers. In embodiments, the instructions may further cause the processors to identify a type of element in each bounding box by one or more of: performing optical character recognition of any markings in the bounding box; providing the images of the detected electronic components from each bounding box to an artificially intelligent classifier for identifying the type of element.

In embodiments, each artificially intelligent classifier may be an artificial neural network with at least 15 hidden layers.

In embodiments, the assembly is an electronic device comprising a printed circuit board, PCB, and the elements comprise electronic components attached to the PCB.

In embodiments, the first and second size ranges may be non-coterminous or non-overlapping. In embodiments, the apparatus may be for detecting non-overlapping components of the assembly.

Viewed from another aspect, the present disclosure provides a computer-implemented method for detecting elements of an assembly. The method uses: first and second artificially intelligent classifiers for detecting elements in a high-resolution image of the assembly. The first artificially intelligent classifier is pre-trained to detect first elements and the second artificially intelligent classifier is pre-trained to detect second elements, each of the first elements having a size within a first size range, and each of the second elements having a size within a second size range, in which the first size range includes elements having a size that is greater than the size of elements included within the second size range. The method comprises: receiving a high resolution image of the assembly; sequentially using the first classifier and then the second artificially intelligent classifier by: creating plural scaled sub-images taken from the high resolution image, each having a size of at least the maximum size of the respective first or second elements, and scaled to be resized to a pixel input image size of the artificially intelligent classifier; and ingesting the scaled sub-images into the artificially intelligent classifier to search for elements in the scaled sub-images; and obtaining, from the output of the artificially intelligent classifier, data indicative of bounding box coordinates in the high resolution image corresponding to detected first and then second elements. The method further includes preventing the second component artificially intelligent classifier from subsequently searching within the bounding boxes previously obtained by the first artificially intelligent classifier.

Viewed from another aspect, the present disclosure provides a computer-implemented method for training a system of artificially intelligent classifiers for detecting elements of a range of different scales in images. The method comprises: receiving a first group of labelled training images of elements falling within a first component size range, the images being scaled to be sized to a pixel input image size of the artificially intelligent classifier; and receiving a second group of labelled training images of elements falling within a second component size range, the images being scaled to be sized to a pixel input image size of the artificially intelligent classifier, wherein the first size range includes elements having a size that is greater than the size of elements included within the second size range. The method further includes training a first artificially intelligent classifier using the first group of labelled training images; and training a second artificially intelligent classifier using the second group of labelled training images.

Viewed from another aspect, the present disclosure provides a computer-implemented method generating a group of labelled training images for training a classifier to identify elements in a given size range. The method includes: receiving plural high resolution images containing elements; for each high resolution image, generating sub-images for elements identified as being present in the high resolution image having dimensions falling within the first and second size ranges; and scaling the sub-images to be sized to a pixel input image size of the artificially intelligent classifier. The generating of the sub-images may include dividing the image into plural overlapping images corresponding to the maximum of the first and second sizes range using a sliding window.

BRIEF DESCRIPTION OF THE DRAWINGS

Embodiments of the invention are further described hereinafter with reference to the accompanying drawings, in which.

DETAILED DESCRIPTION

In devising the present disclosure, the present inventors realised one approach to facilitating the assessment of assemblies of elements, such as electrical, electronic and mechanical components, for example surface mounted to a PCB, would be to perform object detection on images of the assemblies using machine vision and artificial intelligence techniques to detect and identify the elements.

Typically, to detect objects in a scene captured in image data, artificially intelligent classifiers are trained using machine learning or deep learning techniques, with training images labelled with classes of objects to be identified, the extent of which is indicated by bounding boxes. The resulting trained classifier may be an artificial neural network. In the training process, the machine learning characterises the image data that shows the objects of these classes, such that the trained classifier is able to recognise new instances of those objects in new image data. Then, at runtime, pre-trained classifiers can ingest new images of scenes and output data indicating bounding boxes around objects detected in the images of a class of objects the classifier has been trained to detect. The AI classifier may also output a probability that the object is of a class of objects the classifier has been trained to detect.

However, it was realised that using object detection to detect elements in assemblies, such as electronic components mounted to a PCB, presents unique challenges in that such assemblies can carry components adjacent each other that can vary significantly in their size scales. For example, PCB components can be as small as a 0.5-1 mm across for capacitors and small microcontrollers, whereas other components can be up to the order of 100 times larger. Such larger components, for example, in the form of cooled integrated circuit (IC) chips such as Field Programmable Gate Arrays (FPGAs), switched mode power supply components, and functional subassemblies, may be on the order of 100 mm across. To effectively assess such assemblies, all relevant components need to be detected, ranging in size from largest to smallest, that are relevant to understanding the structure and operation of the assembly, to allow appraisal and reverse engineering. Further, due to the fact that such assemblies may be large in their extent (for example, 6U Eurocard PCBs for standard telecoms rack servers can measure 240 mm by 400 mm), and to ensure that captured images of such assemblies contain sufficient detail of the smallest components, the images should be of very high resolution.

Figure 9A:
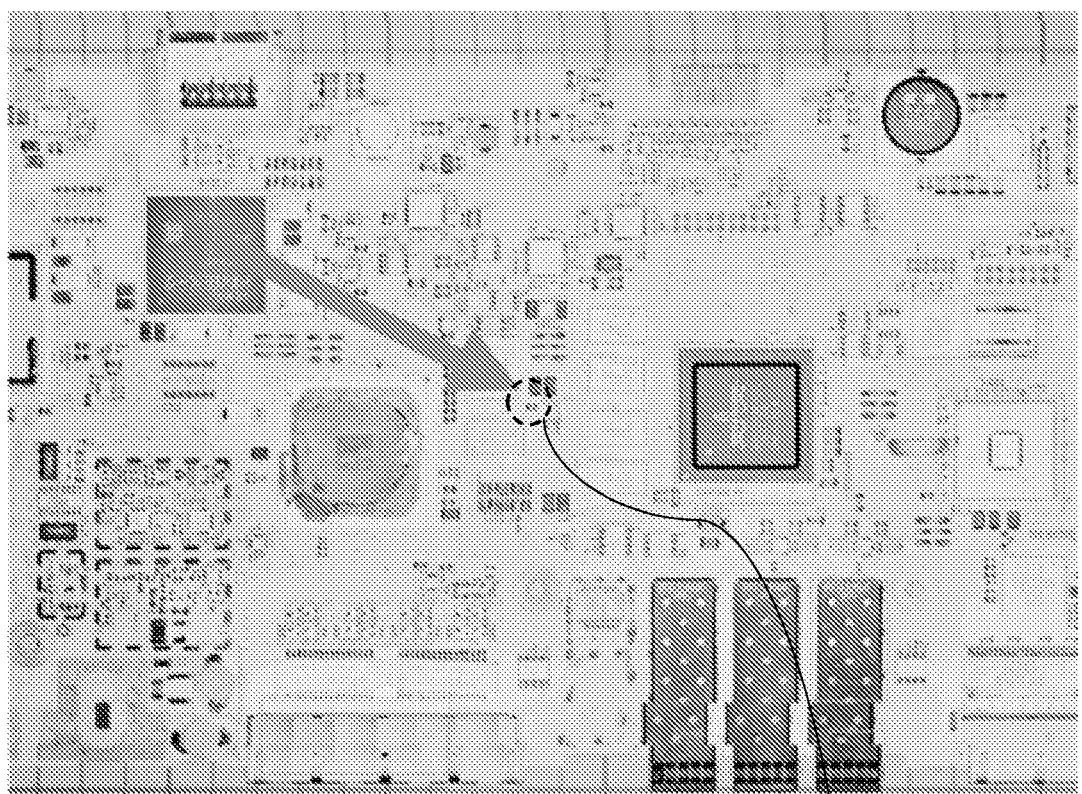
FIGS. 9A and 9B show an example output of the object detection method shown in FIG. 6 illustrating the variation in scale of the detected elements, with FIG. 9B showing a detailed view of an area of FIG. 9A.
Figure 9B:
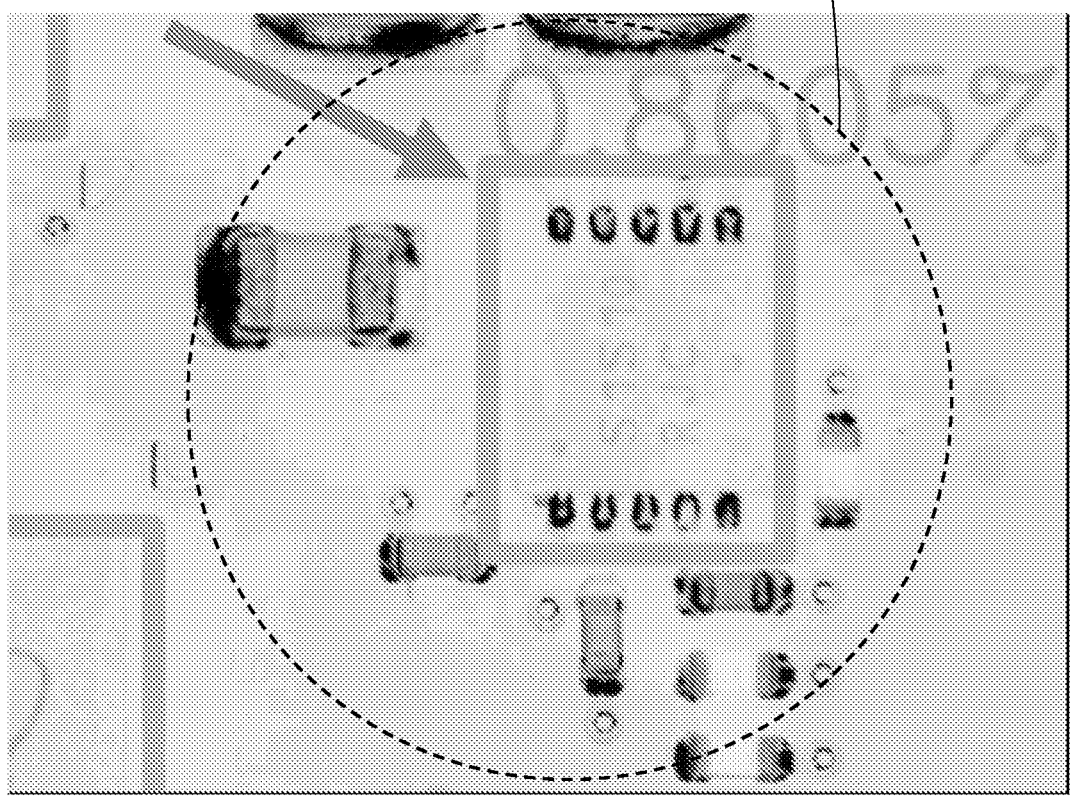

For example, as can be seen in FIG. 9A, which shows a section of a 500 megapixel (34000×15000) image of a PCB, such a high resolution image is needed such that the smallest components for identification can still extend across a few hundred pixels and are resolvable in some detail, which is the minimum needed to perform object identification by machine vision techniques. For example, in FIG. 9B, which shows a detail of the area of FIG. 9A as indicated by the dotted circle, the microcontroller component identified in the bounding box extends across only 270×355 pixels. Object detection of elements may be achieved using machine vision and AI classifier techniques on elements having a pixel extent of at least 50 pixels in at least one direction across the element. As can be seen from FIG. 9A, elements of an assembly such as components of a PCB may be of different shapes and sizes and may be arranged in different orientations in the image or on the PCB. The size of these elements, as they appear in a high resolution image, as described herein, generally refers to the number of pixels in an x or y or any other direction (e.g. diagonal) in the image across which the element extends in at least one direction across the element.

As a result of the size of the high resolution images, training any AI neural network with megapixel images of the size 34000×15000 is effectively not possible. This is primarily because of limitation in the memory size of Graphical Processing Units (GPUs) used in the implementation of the machine learning and runtime processes. For context, existing object detection AI classifiers train with images on the order of 500×500 pixels.

In this instance, to use the high resolution images of the assemblies for training, the labelling data would be given in bounding box coordinates in the megapixel full scale images.

Further, testing any trained AI classifier using such high resolution images would also impractical due to the limitations in the GPU memory register size.

Resizing a high resolution image to the order of 500×500 pixels would render very small objects in the resized images to just disappear and be unresolvable and undetectable if the image were resized. Thus, due to the multiscale size of the objects being searched, simply resizing the images would lead to smaller elements not being detected.

The present disclosure nevertheless provides apparatus and methods for detecting elements of an assembly, such as electronic components surface-mounted to a PCB, to facilitate assessment of such assemblies, using object detection and AI classifiers.

Figure 1:
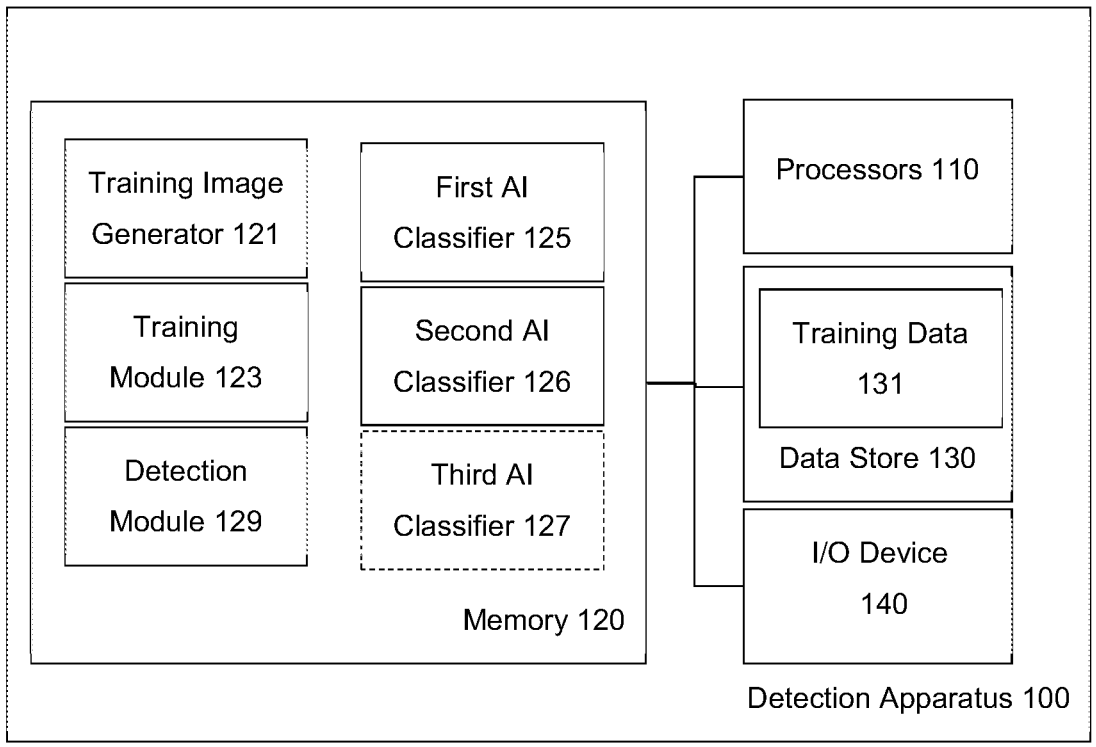
FIG. 1 shows a schematic illustration of an example detection apparatus for detecting elements of an assembly in accordance with aspects of the present disclosure.

A schematic illustration of an example detection apparatus 100 for detecting elements of an assembly in accordance with aspects of the present disclosure is shown in FIG. 1.

The detection apparatus 100 includes one or more processors 110, memory 120, data store 130 and input/output device 140 communicatively coupled by a data bus. The one or more processors 110 may include any suitable data processors, such as central processing units (CPUs) and graphical processing units (GPUs), arranged for executing instructions and carrying out computations. The one or more processors 110 may be provided in a single machine, or they may be provided across a number of different machines, for example by the detection apparatus 100 being implemented on a virtual machine providing an instruction execution environment running on a hypervisor across an array of interconnected servers in a datacentre.

The memory 120 provides a primary storage of software modules and trained AI classifiers for runtime execution by the one or more processors 110. The data store 130 provides persistent secondary storage for training data 131 for training AI classifiers. The data store 130 may also store the various software modules and AI classifiers in non-volatile memory, which may be loaded into the memory 120 at runtime to allow execution. The input/output device 140 may be a network interface for receiving data from outside the apparatus, such as high resolution images of assemblies for processing for object detection by the detection apparatus 100 during training and runtime.

Figure 2:
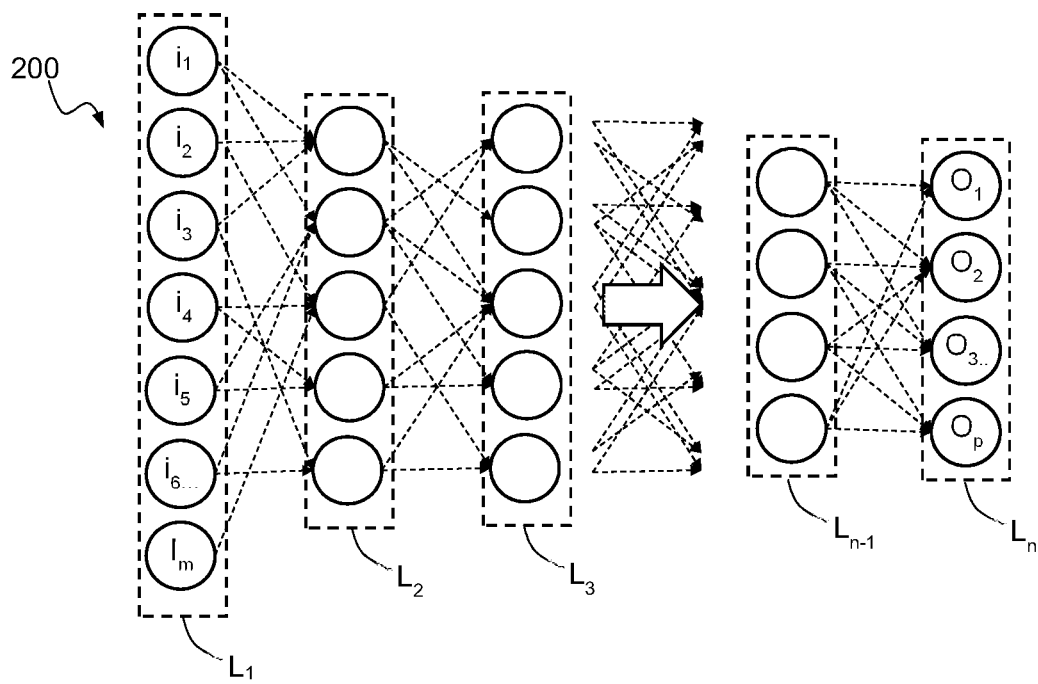
FIG. 2 shows a schematic illustration of an example neural network providing an artificially intelligent classifier for use in the detection apparatus shown in FIG. 1.

The memory 120 stores training image generator module 121, which when executed by the processors 110 causes them to carry out the method shown in FIG. 3, described below, for generating groups of labelled training images for use in training an AI classifier as shown in FIG. 2.

The memory 120 further stores training module 123, which when executed by the processors 110 causes them to carry out the method shown in FIG. 5, described below, for training a system of AI classifiers as shown in FIG. 2 for use in the detection apparatus 100.

Once the training module 123 has been operated to train AI classifiers on the generated training data 131, the memory 120 further stores at least a first trained AI classifier 125 and a second trained AI classifier 126 generated by the training module 123. Although only first and second AI classifiers may be provided, in example embodiments, a third AI classifier 127 may also be generated and stored. In further examples additional AI classifiers may also be stored.

FIG. 2 shows a schematic illustration of an example neural network 200 providing an artificially intelligent classifier for use in the detection apparatus shown in FIG. 1. For example, the first trained AI classifier 125, second trained AI classifier 126 and third AI classifier 127 may all be implemented as neural networks having the structure and operation of the type shown in FIG. 2.

Neural networks are machine learning models that employ multiple layers of nonlinear units (known as artificial "neurons") to generate an output from an input. Neural networks learn through training to produce the optimum output and can classify data when they have a labelled dataset to train on.

Neural networks may be composed of several layers $L_1$, $L_2$, $L_3$, $L_{n-1}$, $L_n$, each layer $L_{1\,n}$ formed from nodes known as artificial neurons, the nodes being represented in FIG. 2 by a circle in the layers $L_{1\,n}$. The input layer $L_1$ has nodes $i_{1\,m}$ sufficient in number to ingest signals from image data of a given size. In an example embodiment, the input layer $L_1$ of AI classifiers 125, 126 and 127 of detection apparatus 100 may have nodes $i_{1\,m}$ sufficient to ingest input images of 416×416 pixels each having a bit length to represent the RGB value for each pixel.

As illustrated in FIG. 2, each node in successive layers receives a signal value from one or more nodes in the preceding layers, processes them according to some nonlinear function, and then passes output signal values to one or more nodes in the subsequent layers, much like neurons and synapses in a biological brain. Different layers may perform different transformations and functions, and may have an increased, or decreased, number of nodes, compared to the preceding layer. The hidden layers $L_{2\,n-1}$ after the input layer $L_1$, provide their output to nodes $O_{1\,p}$ of the output layer $L_n$ of the neural network. In example embodiments, the output layer $L_n$ of AI classifiers 125, 126 and 127 of detection apparatus 100 comprises nodes $O_{1\,p}$, sufficient to indicate as an output (where an object the classifier is pre-trained to detect, is detected in the input image ingested in the input layer $L_1$) the location and size in the input image of a bounding box containing the detected object and a value indicating the probability (i.e. a confidence level) that the detected object is of the detected class. The bounding boxes produced by the AI classifiers 125, 126 and 127 may provide rectangular bounding boxes for detected objects. The bounding boxes may be defined by the x and y coordinates of location in the high resolution image of their top left corner, and by a pixel width in the x direction and height in the y direction. The weighting of the transmitted signals to the different nodes is adjusted and optimised through the training process such that the nodes in the input and hidden layers transform the signal inputs to provide signals output at the output layer such that objects the AI classifier is trained to detect are detected in the input images.

The number of layers used may be greater than 15, such that "deep" learning approaches are used, and the classifier architecture and layers may be configured to optimise learning, accuracy and compute time. Pre-trained object detection algorithms having suitable architectures that are known to perform well in object detection and learning, such as the YOLO architecture (You Only Look Once: https://pjreddie.com/darknet/yolo/) may be used to provide the AI classifiers 125, 126 and 127 by training the YOLO classifiers further to detect elements of an assembly.

In the detection apparatus 100, the generation and use of multiple AI classifiers 125, 126 and 127 is configured to enable effective detection of elements of different size scales in the high resolution image separately and efficiently. That is, the first artificially intelligent classifier 125 is pre-trained to detect first elements and the second artificially intelligent classifier 126 is pre-trained to detect second elements. The elements the first and second AI classifiers are trained to detect are of different size ranges. Specifically, each of the first elements has a size within a first size range, and each of the second elements having a size within a second size range. The first size range includes elements having a size that is greater than the size of elements included within the second size range. The first and second size ranges may be non-coterminous. For example, the size ranges may have an overlapping range where both classifiers are trained to detect elements (the overlap of the ranges may be small), but the ranges may extend from the overlap towards different endpoints, giving different size scale detection coverage. Alternatively, the first and second size ranges may be non-overlapping.

In examples where a third artificially intelligent classifier 127 is provided, the third artificially intelligent classifier 127 may be pre-trained to detect third elements, each of the third elements having a size in a third size range. The third size range may include elements having a size that is less than the second size range. The second and third size ranges may be non-coterminous. For example, the size ranges may have an overlapping range where both classifiers are trained to detect elements (the overlap of the ranges may be small), but the ranges may extend from the overlap towards different endpoints, giving different size scale detection coverage. Alternatively the second and third size ranges may be non-overlapping.

The memory 120 further stores detection module 129, which when executed by the processors 110 causes them to carry out at run time the method shown in FIG. 6 and described below for detecting elements of an assembly using a system of AI classifiers as shown in FIG. 2 and in the detection apparatus 100.

In this way, the detection apparatus 100 includes a plurality of AI classifiers 125, 126, 127, each pre-trained to detect objects in images of assemblies of different size ranges, that are used to detect objects at different size scales.

In assemblies of elements, such as PCBs and integrated circuit layouts, the elements affixed to them may not overlap in extent and elements of different sizes and scales may be placed alongside each other. In such assemblies, a number of smaller elements may also be provided in combination or in arrangements, which may overlap in extent and overlay each other to provide a larger element, such as a sub-assembly which may provide an identifiable function beyond the combination of the sub-assembly components. Thus, while in such assemblies, some or all of the elements may be non-overlapping, some of the larger elements, or views thereof, may comprise large numbers of smaller elements, or may have the visual appearance that they include features which resemble smaller scale elements.

If the AI classifiers 125, 126, 127, trained to detect objects of different size scales, were all operated to detect elements across the high resolution image of the assembly, there would be significant occurrences of bounding boxes from different classifiers that are overlapping with each other. This would give a conflict between different AI classifiers, rendering it unclear which bounding boxes are correct identifications, and which are false positives, which would be difficult to resolve. Further, in some cases, larger elements and subassemblies would not be identifiable or could be in conflict with detections of smaller elements, which would be complicated to resolve. Indeed, it has been found by the inventors that allowing the AI classifiers 125, 126 and 127 to all operate across the high resolution image does not provide accurate insight into the elements actually included in the assembly. Instead, as will be seen below, the detection module 129 is configured to operate the AI classifiers 125, 126 and 127 from the largest-scale (in the example, the first AI classifier 125) to the smallest scale (in the example, the third AI classifier 127), and prevent the smaller-scale artificially intelligent classifier from subsequently searching within the bounding boxes previously obtained by the larger-scale artificially intelligent classifier.

In this way, the detection apparatus 100 is particularly effective for detecting elements of an assembly from largest size scale to smallest, taking a top-down type approach, in order to identify the largest identifiable elements first (e.g. subassemblies) in which components may be grouped together, to the exclusion of the detection of individual components making up the sub-assembly. This can be advantageous where it is preferable to identify, understand and group objects at the highest level of abstraction—e.g. by sub-assemblies first, where component parts are members of the sub-assemblies, and then by components not identifiable as being part of a larger subassembly. It also avoids a proliferation of component detections, and false positive detections due to parts of larger components/subassemblies appearing like smaller components.

In this way, the detection apparatus 100 operates to detect first the largest elements in the assembly using the first AI classifier 125, and then effectively remove these from the search of the high resolution images for the subsequent smaller-scale classifiers (i.e. the second and third AI classifiers 126 and 127). Similarly, the detection apparatus 100 operates to then detect the smaller scale elements in the assembly using the second AI classifier 126, and then effectively remove these from the search of the high resolution images for the subsequent smaller-scale classifier (i.e. the third AI classifier 127). Finally, the detection apparatus 100 operates to then detect the smallest scale elements in the assembly using the third AI classifier 127. In this way, the detection module 129 causes the detection apparatus 100 to operate to quickly and correctly detect a large proportion of elements of greatly different size scales in a high resolution image of an assembly, taking into account the non-overlapping or grouped nature of the components to sequentially detect and remove components or sub-assemblies from the largest down to the smallest size scales.

The detection apparatus 100 is thus particularly effective for object detection of elements in assemblies having non-overlapping arrangements, and where it is preferable to identify, understand and group objects at the highest level of abstraction—e.g. by sub-assemblies first, where component parts are members of the sub-assemblies, and then by components not identifiable as being part of a larger subassembly.

The process for generating the labelled training images of the assembly, and subsequent training of the AI classifiers 125, 126 and 127 for detecting elements in the assembly, will now be described with reference to FIGS. 3, 4A, 4B, 4C and 5. Specific reference will be made to PCB assemblies of surface-mounted electronics components, although this should be understood to be not limiting.

In the training image generation and AI classifier training processes, a strategy is chosen for dividing up the elements to be detected into two or more size ranges corresponding to different size scales of elements in the assembly. A set of labelled training images and a trained AI classifier will be generated for each size range.

In the example, the following three size ranges are set for electronic components for detection:
 A) 12 cm×12 cm to 4 cm×4 cm (for detection by first AI classifier 125)
 B) 5 cm×5 cm to 2 cm×2 cm (for detection by second AI classifier 126)
 C) 2 cm×2 cm to 0.1 cm×0.1 cm (for detection by third AI classifier 127)

The above size ranges are illustrative and non-limiting. However, it is preferable for the size ranges to reflect different types of components, so that AI classifiers detecting different elements in different size ranges can be trained separately. For example, it may be preferable that 1 cm elements and 5 cm elements are in separate size ranges, for example for electronic components in a PCB. Further, it may be preferable for certain sizes to be included for detection in different size scales, such as 4-5 cm elements in the example above. This may facilitate detection in this size range if, for example, any 4-5 cm components are not detected by the first AI classifier 125, they may be detected by the second AI classifier 126.

Figure 3:
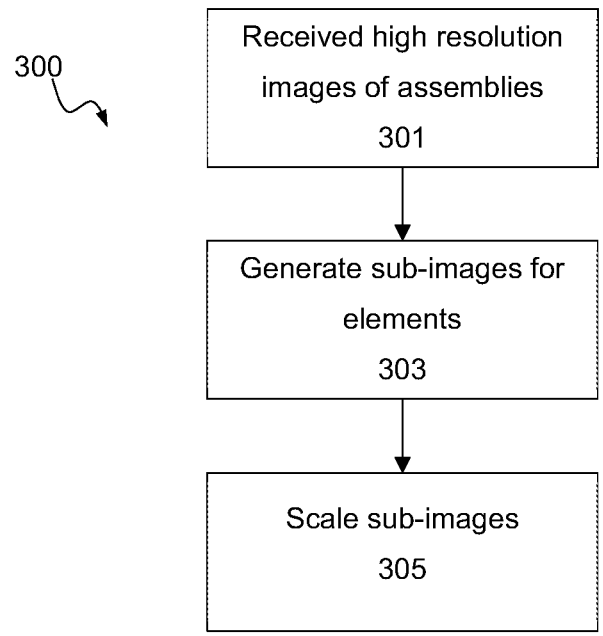
FIG. 3 shows a flow diagram of an example method for generating groups of labelled training images for use in training an AI classifier as shown in FIG. 2.

FIG. 3 shows a method 300 for generating groups of labelled training images for use in training AI classifiers 125, 126 and 127 that is implemented by the detection apparatus 100 under control of training image generator module 121.

Figure 4A:
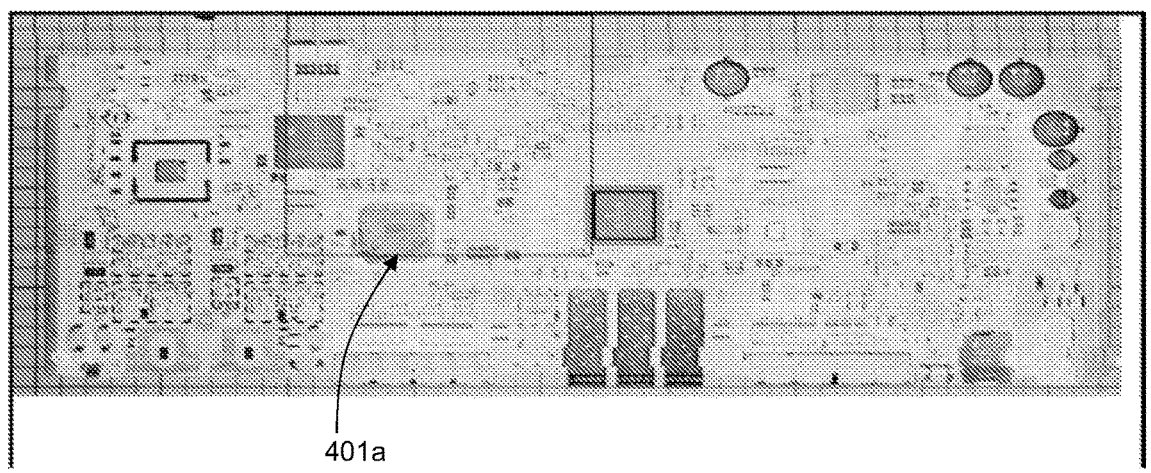
FIG. 4A is an illustration of the generation of a first group of sub-images from a high resolution image of an electronics assembly for training a first AI classifier for use in the detection apparatus shown in FIG. 1.
Figure 4B:
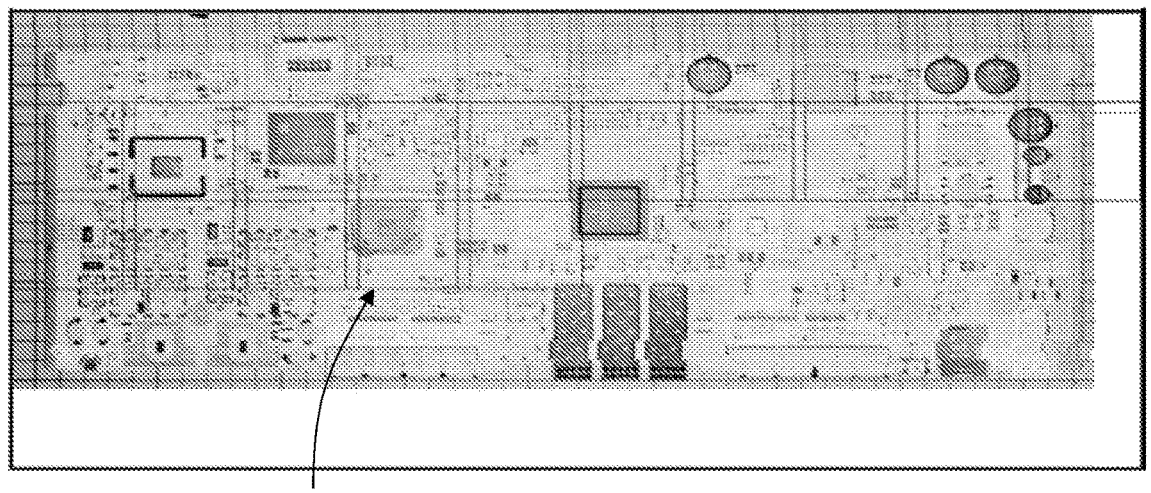
FIG. 4B is an illustration of the generation of a second group of sub-images from the high resolution image of the electronics assembly for training a second AI classifier for use in the detection apparatus shown in FIG. 1.
Figure 4C:
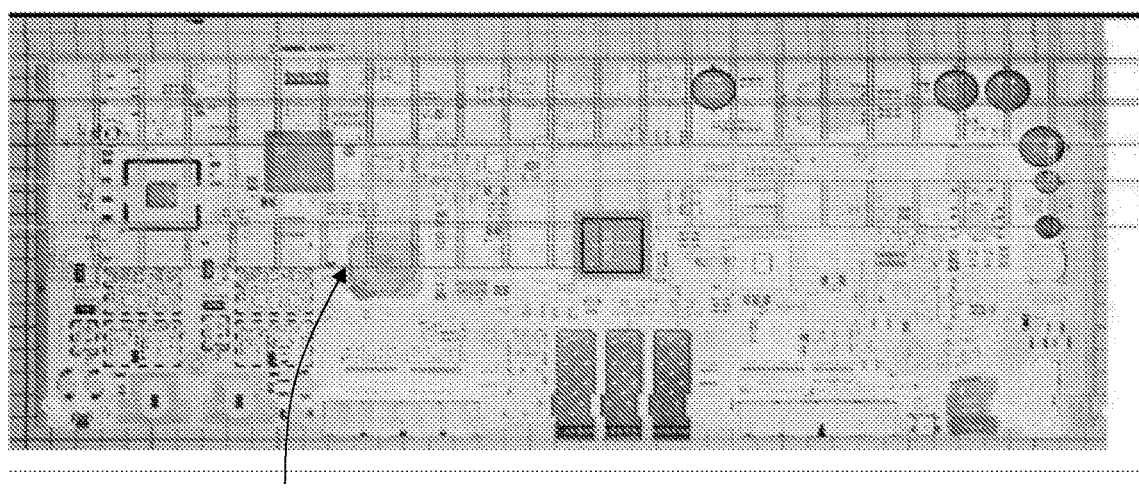
FIG. 4C is an illustration of the generation of a third group of sub-images from the high resolution image of the electronics assembly for training a third AI classifier for use in the detection apparatus shown in FIG. 1.

In step 301, high resolution images of assemblies of elements, such as PCBs, are received, for example at input/output device 140 and stored in data store 131. An example of such an image is shown in FIGS. 4A, 4B and 4C, which is a 34000×15000 pixel image of a PCB with components of a range of different sizes. The size of the field of view is known so that the sub-images are scaled correctly, but the squares of the background sheet facilitate an assessment of the size of the assembly and components.

Then, in step 303, for each high resolution image of an assembly in the training set, sub-images are generated for elements present in the high resolution image having dimensions falling within each of the selected size ranges. This is shown in FIGS. 4A, 4B and 4C, in that the high resolution image is divided into plural overlapping images corresponding to the maximum of the size range using a sliding window. As can be seen in FIG. 4A, a sliding window 401a of 12 cm×12 cm may pass through the high resolution image. Further, as can be seen in FIG. 4B, a sliding window 401b of 5 cm×5 cm may pass through the high resolution image. Finally, as can be seen in FIG. 4C, a sliding window 401c of 2 cm×2 cm may pass through the high resolution image.

If in any sliding window a component within the size range's dimensions (e.g. 12×12 cm to 4×4 cm for the first size range) exists within the window (for example, more than about 85% of the component's total surface), an image of the component is generated by manually marking the elements and automatically generating a sub-image. Training classifiers to be based on partial views of elements (i.e., where an element is partly concealed by another element) facilitates the detection of overlapping elements.

These sub-images are then scaled in step 305 for training by resizing them to be sized to a pixel input image size of the artificially intelligent classifier. That is, in the example, the sub-images as scaled to 416×416 pixels.

As can be seen from FIGS. 4A, 4B and 4C, every sliding window is overlapping with the previous one, so as to be sure that the whole of the component is within the sliding window. In examples, during training the overlapping area of one window with the previous window may be by a factor of 60%. In other examples, the overlapping area may be at least 50% or a higher level of at least 70%, 80% or 90%. The overlap during training may be lower than during testing (as described below).

Once the scaled sub-images have been generated through the sliding windows for each size range, these images are stored in data store 130 as labelled training data 131, grouped according to the size range. The labelling of the training data includes an indication of the class of object in the scaled sub-image, to train the classifier to identify that object class through the training process.

The AI classifiers may be trained and configured to detect only a single class of objects corresponding to candidate detections of elements. This is rather than trying to train the classifiers to detect and determine the difference between different classes of element in the object detection stage. It has been found that detecting elements as a single class of objects allows the AI classifiers to provide a simple and accurate identification of the presence of an element. The detected elements can then be identified in a subsequent identification step (for example, by using optical character recognition of any markings on the detected element, or by using a further AI classifier to detect different types of element).

As a result, the training images in training data 131 may simply be labelled with a value of "1" for the single class "element". In the example, the single class represents "electronic component" of any sort, in the given size range for that group.

Figure 5:
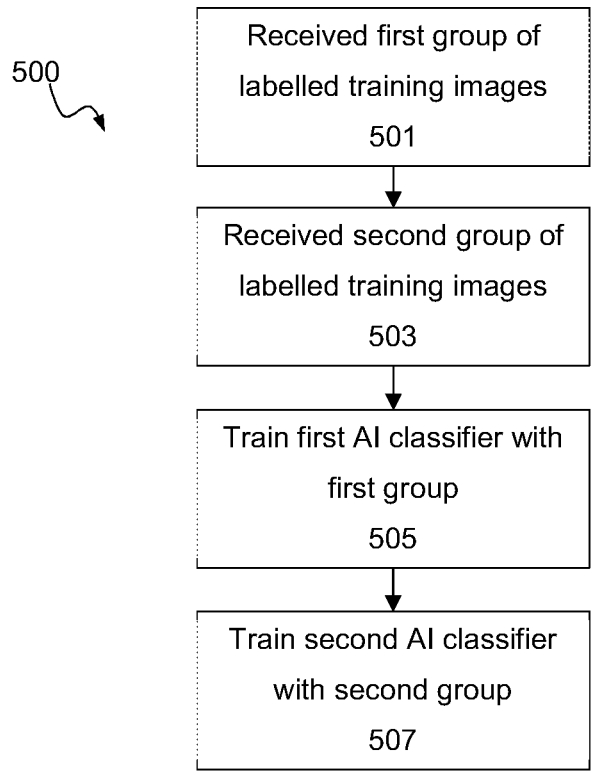
FIG. 5 shows a flow diagram of an example method for training a system of first and second AI classifiers as shown in FIG. 2 for use in the detection apparatus shown in FIG. 1.

FIG. 5 shows a method 500 for training AI classifiers 125, 126 and 127 that is implemented by the detection apparatus 100 under control of training module 123.

In step 501, a first group of labelled training images of elements falling within the first component size range is received.

In step 503, a second group of labelled training images of elements falling within a second component size range.

In the example, this is performed by retrieving the first and second groups of labelled training images of electronic components from training data 131 stored in data store 130. Where further classifiers are to be trained for detecting elements in further size ranges, further groups of labelled training data may be obtained from training data 131 stored in data store 130, such as the third group generating the third AI classifier 127.

In step 505, the method further includes training a first artificially intelligent classifier using the first group of labelled training images. In this way, the first AI classifier 125 is trained using labelled training images of electronic components having a size in the range 12 cm×12 cm to 4 cm×4 cm, in a learning process that adjusts the weights of the outputs of the nodes in the neural network for detection of electronic components at that scale.

In step 507, the method further includes training a second artificially intelligent classifier using the second group of labelled training images. In this way, the second AI classifier 126 is trained using labelled training images of electronic components having a size in the range 5 cm×5 cm to 2 cm×2 cm, in a learning process that adjusts the weights of the outputs of the nodes in the neural network for detection of electronic components at that scale.

In the example, the method further includes training a third artificially intelligent classifier using the third group of labelled training images. In this way, the third AI classifier 127 is trained using labelled training images of electronic components having a size in the range 2 cm×2 cm to 0.1 cm×0.1 cm, in a learning process that adjusts the weights of the outputs of the nodes in the neural network for detection of electronic components at that scale.

The resulting trained AI classifiers 125, 126 and 127 may be stored in data store 130 and at runtime loaded into memory 120 for execution to detect elements in new images of assemblies, under control of detection module 129.

Figure 6:
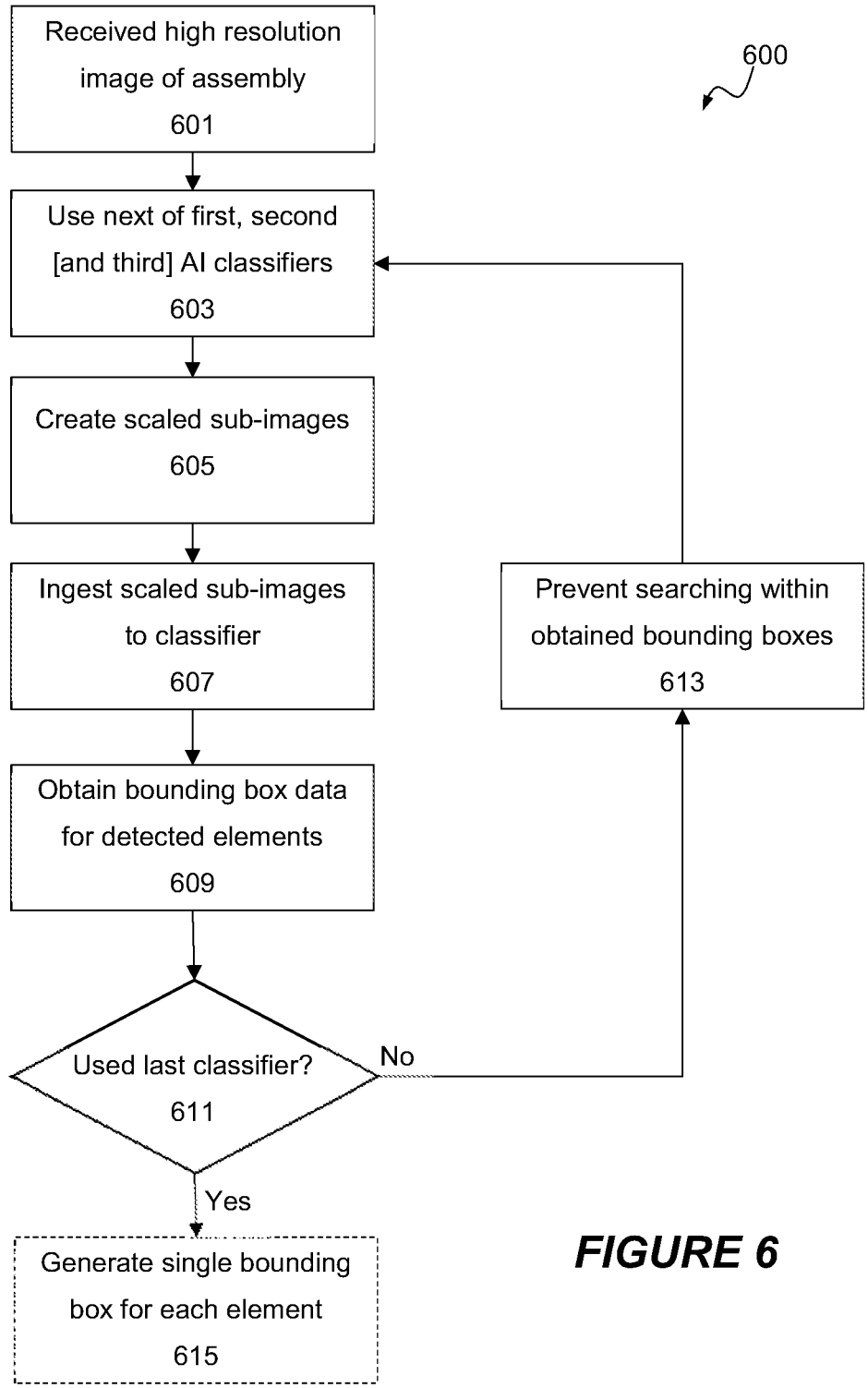
FIG. 6 shows a flow diagram of an example method for detecting elements of an assembly using the detection apparatus shown in FIG. 1.

FIG. 6 shows a method 500 for detecting elements of an assembly using a system of AI classifiers as shown in FIG. 2 that is implemented by the detection apparatus 100 under control of detection module 129.

Figure 7:
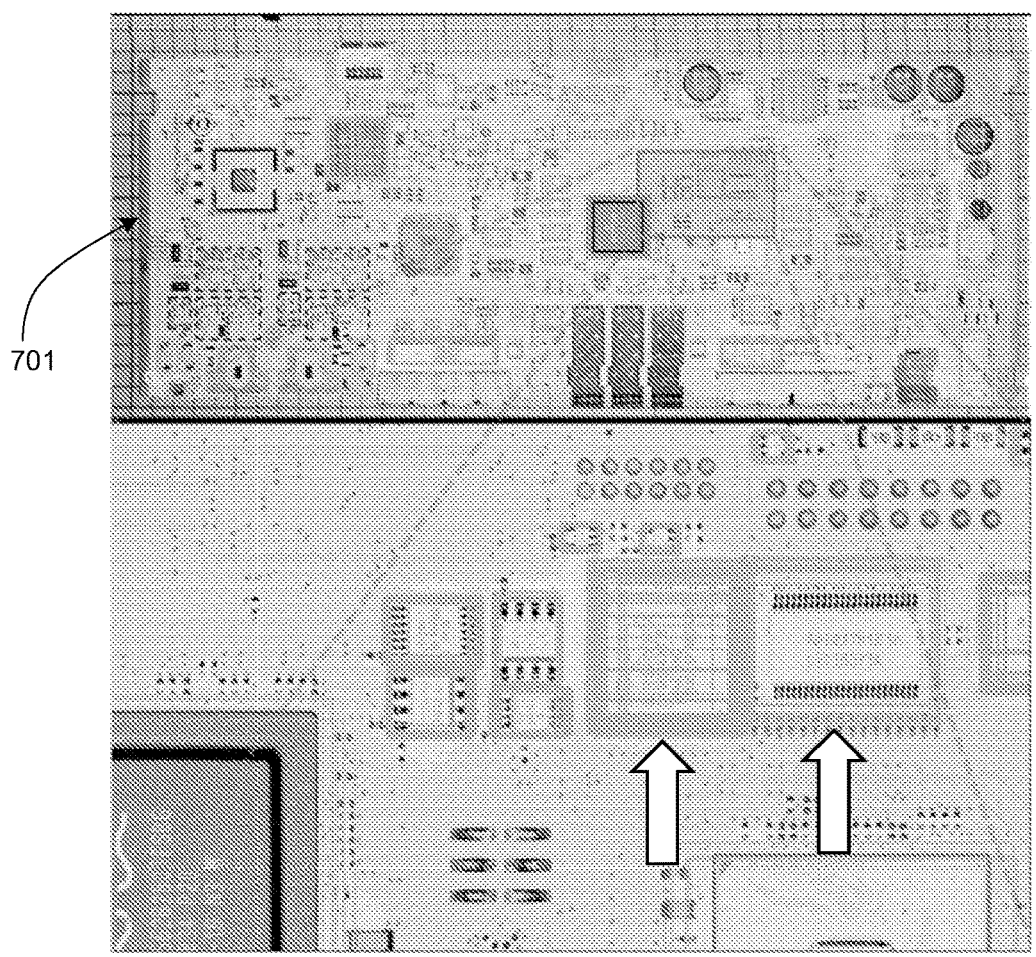
FIG. 7 is an illustration of the plural bounding boxes output by the AI classifiers in the method shown in FIG. 6, the bounding boxes indicating electronic elements detected in a high resolution image.

In step 601, a high resolution image of an assembly is received, in which elements are to be detected. An example high resolution image 701 for detection is shown in FIG. 7.

In step 603, the first and then second artificially intelligent classifiers 125 and 126 are used in sequence to perform object detection on the image 701, from the classifier trained to detect the largest scale elements, to the classifier trained to detect the smallest scale elements. Where a third AI classifier 127 is provided, this is also used in sequence in step 603. In the example, the first AI classifier 125 is used first, and the process advances to step 605.

In step 605, scaled sub-images taken from the high resolution image 701 are created for testing and object detection. A sliding window may be used. The overlap in area between subsequent windows may now be much higher than during training, at around 90%, to provide a high level of detection accuracy. In other examples, the overlapping area may be at least 50% or a higher level of at least 60%, 70% or 80%. The overlap during testing may be higher than during training. Selection of the overlap during testing is a trade-off between precision/recall and execution time, where a greater overlap results in greater precision/recall but longer execution time. Here, recall is the number of true positives identified by a classifier divided by the total number of actual positives, and precision is the number of true positives identified by classifier divided by the number of all positives identified by classifier (i.e., including false positives). A higher precision/recall gives a more accurate detection classifier. In the example, a high level of overlap was selected, at 90%, as precision/recall deemed to be more important. However, the overlap can be optimised to balance precision/recall and execution time.

Each sub-image has a size of at least the maximum size of the respective first or second elements, and is scaled to be resized to a pixel input image size of the artificially intelligent classifier. That is, the sub-images from the initial high resolution images are scaled by resizing them by a factor given by the following equation, different in value for each size range:

$$\text{resize factor} = \frac{\text{max size of element in current size range(in pixels)}}{\text{size of image that can be ingested into AI classifier(in pixels)}}$$

In the example, the sub-images from the sliding window for each size range are scaled to 416×416 pixels to correspond to the input layer size of the AI classifiers 125, 126 and 127. In this way, the scaling ensures the ratio between components in the training and in the detection phase will remain the same for each size range.

In step 607, the scaled sub-images are ingested into the artificially intelligent classifier for that size range to search for elements in the scaled sub-images. In this way, the artificially intelligent classifier seeks in the scaled sub-images elements only within the size range it has been trained to detect (e.g. in the example, only within 12×12 cm to 4×4 cm for the first AI classifier 125).

Figure 8:
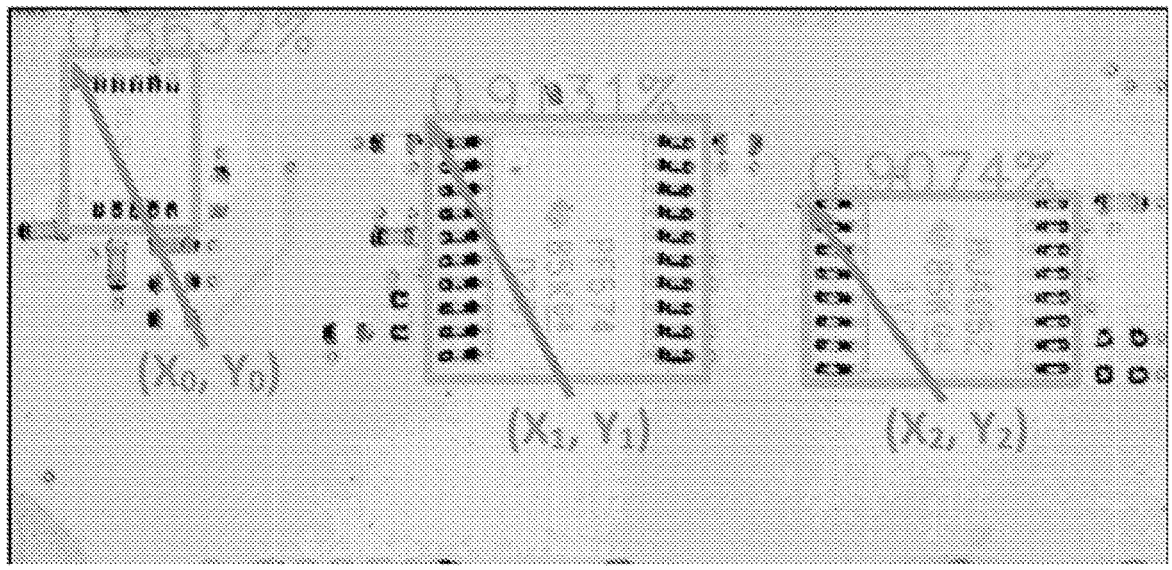
FIG. 8 shows the output of the bounding box suppression in the method shown in FIG. 6 in which single bounding boxes are generated for each detected element.

In step 609, from the output layer of the AI classifier, data indicative of bounding box coordinates in the high resolution image 701 corresponding to detected first and then second elements is obtained. That is, if in a current sliding window a component in within the size range of the team is found, its coordinates, size and detection probability as output from the output layer of the AI classifier are obtained and stored. Example bounding boxes for detected electronic components are shown in FIG. 8.

As will be appreciated from the below, however, due to the overlap of the sliding detection window, a number of bounding boxes may be generated for the same component by a single AI classifier. The generation of multiple bounding boxes for the same component can be seen in the detail of the boxed area in FIG. 7, as indicated by the arrows in the lower section thereof.

When an AI classifier has finished and a number of bounding boxes have been obtained for objects detected in the searched size range, a check is made at step 611 to see whether the last classifier has been used (i.e. the AI classifier trained to detect elements in the smallest size range). If not, the process is returned to step 603 to use the AI classifier that is trained to detect elements in the next smallest size range.

That is, in the example, if the first AI classifier 125 has completed its object detection in the scaled sub-images, the second AI classifier 126 is then used. Similarly, if the second AI classifier 126 has completed its object detection in the scaled sub-images, the third AI classifier 127 is then used.

However, before the next AI classifier is used at step 603, the step 613 is carried out to prevent subsequently used classifiers from searching within bounding boxes obtained in step 609 by the preceding AI classifier.

In the example, if the first AI classifier 125 has just been used, step 613 prevents the second and third AI classifiers 126 and 127 from subsequently searching within the bounding boxes previously obtained by the first AI classifier 125. If the second AI classifier 126 has just been used, step 613 prevents the third AI classifier 127 from subsequently searching within the bounding boxes previously obtained by the second AI classifier 126. This prevention may be achieved in step 613 by obscuring the areas inside the bounding boxes in the high-resolution image, such as by blanking them out or filling the pixels inside the obtained bounding boxes with blocks of colour.

In this way, where assemblies of elements are multiscale and non-overlapping, or smaller elements are overlapping or are arranged nested within each other to provide larger components, such as sub-assemblies, such as with a PCB with surface mounted components, detection of the elements of interest can be performed with a high degree of accuracy from largest to smallest, with fewer false positives, in a relatively short amount of time.

Once the last AI classifier (in the example, the third AI classifier 127) has completed its detection of objects in the scaled sub-images, the detection module 129 may end the detection method 600 at step 611 and provide as an output data indicative of bounding box coordinates in the high-resolution image, the bounding box coordinates corresponding to elements detected by the artificially intelligent classifiers.

However, in embodiments, to reduce overlapping bounding boxes representing duplicate detections, the method 600 may proceed to step 615 in which single bounding boxes are generated for each element, from the bounding boxes obtained from all of the AI classifiers at step 611.

That is, in the use of the first and subsequent AI classifiers, the bounding boxes from the detected objects in the scaled sub-images for each size range are obtained in step 609. This results in a large number of bounding boxes being obtained, many of which will overlap and represent detections of the same object by the same classifiers. Nevertheless, as subsequently used AI classifiers are prevented from searching inside bounding boxes obtained from previously used classifiers, the pixel extent of the bounding boxes for the elements detected by each of the artificially intelligent classifiers are spatially separated from the pixel extent of the bounding boxes for the elements detected by the one or more other artificially intelligent classifiers.

These conflicts from object detections by the same classifiers need to be resolved and overlapping bounding boxes covering the same element need to be suppressed until a single bounding box representing a detection of the object is provided. Thus, in step 615 single bounding boxes are generated for each element from the obtained bounding boxes.

However, if in step 615, every bounding box in the obtained data were tested with all the other bounding boxes for overlapping, then the complexity of the algorithm is $O(n)=n!$. If the number, n, of detected bounding boxes is not high, then the computational burden of resolving the overlapping bounding boxes is manageably low. However, since there can be hundreds to many thousands of elements in these assemblies, such as in PCBs, and as each element can be detected by the AI classifiers on the order of hundreds of times, due to the high overlap of the sliding window, the method 600 can provide as an input to step 615 tens to hundreds of thousands of bounding boxes. Thus testing every bounding box in the obtained data with all the other bounding boxes for overlapping would give an extremely high computational burden.

Thus, in step 615, the detection module 129 may, in the data indicative of bounding box coordinates in the high-resolution image, sort the bounding boxes in order by their coordinates and group the ordered bounding boxes into separate lists of M bounding boxes. For example, the bounding boxes may be sorted by the x coordinate of their top left corner and grouped into groups of 100 bounding boxes.

Within each group, the bounding boxes may be tested for overlapping extent, and any overlapping bounding boxes may be discarded. Discarding of bounding boxes may be based on the size and confidence level attributed to the detection. For example, the largest and most confident bounding box may be retained, and the other bounding box(es) may be discarded.

This sorting, grouping and discarding overlapping bounding boxes within the list of grouped bounding boxes is then repeated until no overlapping bounding boxes remain in the groups. The sorting and grouping may alternate by x and then alternate by x and then y coordinates for the boxes.

To ensure no overlapping components remain, a final division into a larger group size may be performed. For example, a final group size of 131 bounding boxes may be used.

In this way, a set of coordinates for respective single bounding boxes of each component within the high resolution image may be generated, with the complexity of the problem being reduced from n! down to $O(n) \approx n*M!$, which for a value of M of around 100 is a much lower computational load, than for a computation with a complexity of n!, where n is on the order of $10^4$-$10^5$.

An output from step 615 of single bounding boxes around three detected components is shown in FIG. 8. As can be seen, in the example, the detection probability indicated is for a single class of objects only. In the example, this is electronic elements in the size range for that AI classifier. Detecting only the presence of a generic electronic component at this stage leads to a high degree of accuracy of object detection, as there is a significant number of different types of electronic component, and training an AI classifier to detect the different types at the object detection stage would reduce the detection accuracy as the classifier would try to distinguish between them, meaning that some objects may not be detected.

Thus, in embodiments, the output bounding boxes from method 600 indicated detected elements may be processed further to identify a type of element in each bounding box detected by the artificially intelligent classifiers. For example, to identify a type of element in each bounding box, optical character recognition of any markings in the bounding box may be performed. For example, any markings on the electronic component may be recognised and used to try to identify the electronic component. Further, images of the detected electronic components from each bounding box may be provided to a further artificially intelligent classifier for identifying the type of element. Alternatively, the AI classifiers 125, 126 and 127 may be trained to detect different classes of elements, and assign probabilities that the elements are of the pre-trained detection classes at runtime.

In accordance with the forgoing disclosure, the detection apparatus 100 and methods 300, 500 and 600 may be used to detect multiscale elements in high resolution images of assemblies to a high degree of accuracy, with fewer false positives, in a short timescale. When applied to assemblies like printed circuit boards, the method may be useful in detecting and identifying the electronic components provided thereon, to provide an understanding of the PCBs and to assess their appropriateness for sourcing from the equipment provider and for use in building a complex system such as a mobile communications network. Although in the disclosure, the methods and apparatuses have been described in detail with particular reference to detecting electronic components surface mounted in PCBs, this is not intended to be limiting in any way on the disclosure. Indeed, the methods and apparatuses of the present disclosure should be understood to be applicable to detecting elements of any suitable assembly, such as elements in an integrated circuit layout, or any suitable mechanical assembly.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. In particular, any dependent claims may be combined with any of the independent claims and any of the other dependent claims.

The invention claimed is:

1. An apparatus for detecting elements of an assembly, comprising:
  one or more processors; and
  memory storing first and second artificially intelligent classifiers for detecting elements in a high-resolution image of the assembly, wherein the first artificially intelligent classifier is pre-trained to detect first elements and the second artificially intelligent classifier is pre-trained to detect second elements, each of the first elements having a size within a first size range, and each of the second elements having a size within a second size range, in which the first size range includes elements having a size that is greater than the size of elements included within the second size range;
  the memory comprising instructions which, when executed by one or more of the processors, cause the processor(s) to:
  receive a high resolution image of the assembly;
  sequentially use the first classifier and then the second artificially intelligent classifier to:
    create plural scaled sub-images taken from the high resolution image, each sub-image having a size of at least the maximum size of the respective first or second elements, and scaled to be resized to a pixel input image size of the artificially intelligent classifier;
    ingest the scaled sub-images into the artificially intelligent classifier to search for elements in the scaled sub-images; and
    obtain, from the output of the artificially intelligent classifier, data indicative of bounding box coordinates in the high resolution image corresponding to detected first and then second elements;
  the memory further comprising instructions to cause the processor(s) to prevent the second artificially intelligent classifier from subsequently searching within the bounding boxes previously obtained by the first artificially intelligent classifier.

2. The apparatus as claimed in claim 1, the memory further storing a third artificially intelligent classifier pre-trained to detect third elements, each of the third elements having a size in a third size range; in which the third size range includes elements having a size that is less than the size of elements included within the second size range; the instructions further causing the processors to:
  sequentially use the second and then the third artificially intelligent classifier to:
    create plural scaled sub-images taken from the high resolution image, each sub-image having a size of at least the maximum size of the respective second or third size range, and scaled to be resized to a pixel input image size of the artificially intelligent classifier;
    ingest the scaled sub-images into the artificially intelligent classifier to search for elements in the scaled sub-images; and
    obtain, from the output of the artificially intelligent classifier, data indicative of bounding box coordinates in the high resolution image corresponding to detected first and then second elements;
  the memory further comprising instructions to cause the processor(s) to prevent the third artificially intelligent classifier from subsequently searching within the bounding boxes obtained by the first and second artificially intelligent classifiers.

3. The apparatus as claimed in claim 1, the instructions further causing the processor(s) to create the plural scaled sub-images for each of the artificially intelligent classifiers, by moving a sliding window through the high-resolution image, in which the sliding window has a size of at least the maximum size of the respective elements, such that each sequential sub-image overlaps the area of the previous sub-image by at least 50%, the sub-images being scaled for ingesting into the corresponding artificially intelligent classifier.

4. The apparatus as claimed in claim 1, wherein one of the size ranges includes elements having a size of 1 cm across and another of the size ranges includes elements having a size of 5 cm across.

5. The apparatus as claimed in claim 1, wherein the pixel extent of the bounding boxes for the elements detected by each of the artificially intelligent classifiers are spatially separated from the pixel extent of the bounding boxes for the elements detected by the one or more other artificially intelligent classifiers.

6. The apparatus as claimed in claim 1, the instructions further causing the processor(s) to prevent the second artificially intelligent classifier from subsequently searching within the bounding boxes obtained by the first artificially intelligent classifier by obscuring the areas inside the bounding boxes in the high-resolution image.

7. The apparatus as claimed in claim 1, the instructions further causing the processors to:
  store, in the memory, data indicative of bounding box coordinates in the high-resolution image, the bounding box coordinates corresponding to elements detected by the artificially intelligent classifiers; and repeatedly, and until no overlapping bounding boxes are found:
- sort the bounding boxes in order by their coordinates;
- group the ordered bounding boxes into separate lists of bounding boxes; and within each group, test the bounding boxes for overlapping extent; and
- discard any overlapping bounding boxes; to thereby generate a set of coordinates for respective single bounding boxes of each component within the high resolution image.

8. The apparatus as claimed in claim 1, wherein each artificially intelligent classifier is configured to detect only a single class of objects corresponding to candidate detections of elements.

9. The apparatus as claimed in claim 1, the instructions further causing the processors to identify a type of element in each bounding box detected by the artificially intelligent classifiers.

10. The apparatus as claimed in claim 9, the instructions further causing the processors to identify a type of element in each bounding box by one or more of:
- performing optical character recognition of any markings in the bounding box; and
- providing the images of the detected electronic components from each bounding box to an artificially intelligent classifier for identifying the type of element.

11. The apparatus as claimed in claim 1, wherein each artificially intelligent classifier is an artificial neural network with at least 15 hidden layers.

12. The apparatus as claimed in claim 1, wherein the assembly is an electronic device comprising a printed circuit board, PCB, and the elements comprise electronic components attached to the PCB.

13. The apparatus as claimed in claim 1, wherein the first and second size ranges are non-coterminous or non-overlapping.

14. The apparatus as claimed in claim 1, wherein the apparatus is for detecting non-overlapping components of the assembly.

15. A computer-implemented method for detecting elements of an assembly using:
- first and second artificially intelligent classifiers for detecting elements in a high-resolution image of the assembly, wherein the first artificially intelligent classifier is pre trained to detect first elements and the second artificially intelligent classifier is pre trained to detect second elements,
- each of the first elements having a size within a first size range, and each of the second elements having a size within a second size range, in which the first size range includes elements having a size that is greater than the size of elements included within the second size range;

the method comprising:
- receiving a high resolution image of the assembly;
- sequentially using the first classifier and then the second artificially intelligent classifier by:
  - creating plural scaled sub-images taken from the high resolution image, each having a size of at least the maximum size of the respective first or second elements, and scaled to be resized to a pixel input image size of the artificially intelligent classifier; and
  - ingesting the scaled sub-images into the artificially intelligent classifier to search for elements in the scaled sub-images;
  - obtaining, from the output of the artificially intelligent classifier, data indicative of bounding box coordinates in the high resolution image corresponding to detected first and then second elements; and
- preventing the second component artificially intelligent classifier from subsequently searching within the bounding boxes previously obtained by the first artificially intelligent classifier.

16. A method of training a system of artificially intelligent classifiers for detecting elements of a range of different scales in images, comprising:
- receiving a first group of labelled training images of elements falling within a first component size range, the images being scaled to be sized to a pixel input image size of the artificially intelligent classifier;
- receiving a second group of labelled training images of elements falling within a second component size range, the images being scaled to be sized to a pixel input image size of the artificially intelligent classifier, wherein the first size range includes elements having a size that is greater than the size of elements included within the second size range;
- training a first artificially intelligent classifier using the first group of labelled training images; and
- training a second artificially intelligent classifier using the second group of labelled training images.

17. The method as claimed in claim 16, further comprising:
- generating a group of labelled training images for training a classifier to identify elements in a given size range by:
  - receiving plural high resolution images containing elements;
  - for each high resolution image, generating sub-images for elements identified as being present in the high resolution image having dimensions falling within the first and second size ranges; and
  - scaling the sub-images to be sized to a pixel input image size of the artificially intelligent classifier.

* * * * *